(12) United States Patent  
Braithwaite (10) Patent No.: US 8,342,758 B2  
(45) Date of Patent: Jan. 1, 2013

(54) CAMERA DEVICE

(75) Inventor: Sarah Louise Braithwaite, Mold (GB)

(73) Assignee: Bakhu Limited, Southport (GB)

( * ) Notice: Subject to any disclaimer, the term of this patent is extended or adjusted under 35 U.S.C. 154(b) by 0 days.

(21) Appl. No.: 12/865,260

(22) PCT Filed: Jan. 23, 2009

(86) PCT No.: PCT/GB2009/050068  
§ 371 (c)(1),  
(2), (4) Date: Jan. 10, 2011

(87) PCT Pub. No.: WO2009/095709  
PCT Pub. Date: Aug. 6, 2009

(65) Prior Publication Data  
US 2011/0097069 A1    Apr. 28, 2011

(30) Foreign Application Priority Data

Jan. 29, 2008 (GB) .................................. 0801574.5

(51) Int. Cl.  
*G03B 17/00* (2006.01)

(52) U.S. Cl. ......... 396/420; 396/419; 396/423; 396/428

(58) Field of Classification Search .......... 396/419–428; 2/417  
See application file for complete search history.

(56) References Cited

U.S. PATENT DOCUMENTS

| 2,369,829 | A | * | 2/1945 | Johnson | 224/181 |
| 5,583,571 | A | | 12/1996 | Friedland | |
| 5,893,496 | A | | 4/1999 | Katz et al. | |
| 6,028,627 | A | * | 2/2000 | Helmsderfer | 348/157 |
| 6,055,048 | A | * | 4/2000 | Langevin et al. | 356/237.1 |
| 7,186,159 | B1 | * | 3/2007 | Baxter | 441/124 |
| 7,334,714 | B2 | * | 2/2008 | Brown | 224/623 |
| 7,369,174 | B2 | * | 5/2008 | Olita et al. | 348/373 |

(Continued)

FOREIGN PATENT DOCUMENTS

DE        19542835         5/1997

(Continued)

OTHER PUBLICATIONS

International Search Report, Apr. 20, 2009 in counterpart foreign application under the WIPO, Application No. PCT/GB2009/050068.

(Continued)

*Primary Examiner* — Clayton E Laballe  
*Assistant Examiner* — Kevin Butler  
(74) *Attorney, Agent, or Firm* — Andrews Kurth, LLP; Michael Ye (57) ABSTRACT

The invention concerns a camera head mount comprising: a strap for encircling the head and means for securing the strap around the head to prevent or hinder slippage of the camera head mount once secured in its mounted position; a camera holding pocket provided on the strap and situated such that when the camera head mount is secured in its mounted position the camera holding pocket is adapted to hold a camera in a forward-facing position against the forehead of the user, the lens of a mounted camera pointing forwards and through a lens aperture provided in the camera holding pocket at the front thereof, the camera holding pocket otherwise being adapted substantially to enclose a camera therein in a mounted and supported position on the forehead of the user.

33 Claims, 6 Drawing Sheets

U.S. PATENT DOCUMENTS

| | | | |
|---|---|---|---|
| 7,753,759 B2 * | 7/2010 | Pintor et al. | 450/89 |
| 8,001,624 B1 * | 8/2011 | Leedom | 2/425 |
| 2003/0106918 A1 * | 6/2003 | Hung | 224/222 |
| 2005/0127296 A1 * | 6/2005 | Reilly et al. | 250/330 |
| 2006/0008269 A1 | 1/2006 | Woodman | |
| 2007/0280675 A1 | 12/2007 | Woodman | |
| 2010/0254017 A1 * | 10/2010 | Martins | 359/631 |
| 2011/0219522 A1 * | 9/2011 | Petitt | 2/422 |
| 2012/0104058 A1 * | 5/2012 | Hernandez et al. | 224/195 |

FOREIGN PATENT DOCUMENTS

| | | |
|---|---|---|
| FR | 2732121 | 9/1996 |
| JP | 07131697 | 5/1995 |

OTHER PUBLICATIONS

GB Search Report Under Section 17(5) issued May 30, 2008 in GB priority Application No. GB0801574.5.

* cited by examiner

CAMERA DEVICE

SUMMARY

The present invention relates to a support strap for a camera, and relates more particularly to an elasticated strap that allows a camera or mobile phone to be mounted universally to a users head or headwear.

As technology (particularly digital technology) has developed, cameras etc, and in particular digital cameras, have reduced in size making them lighter, more compact and easier to store and carry. Advances in media storage has allowed such cameras to record and store larger files allowing traditional still image devices to be used to capture reasonable sized files of moving imagery.

With the advent of the interne and websites such as You-Tube, FaceBook etc there is a growing desire for people to upload images, particularly moving images captured from pocket cameras or mobile phones. These images typically record everyday activities of people taking part in various sporting activities and the like. For example, it is not uncommon for people taking part in activities such as skiing, snowboarding, horse riding and so forth, to take so-called action shots when engaging in these activities. Action shots show the activity from the perspective of the participant and can be still or video images dependent on the camera used.

The majority of this footage is captured 'on the spur of the moment' from an every-day, pocket sized device such as a camera or phone.

The problem with taking photographs when engaging in such activities is that when searching for a camera or when framing the photograph in the camera viewfinder, the user's attention can be diverted, resulting in loss of balance or even collision with unnoticed obstructions.

There are arrangements which allow the user to take photographs when engaging in sporting activities. U.S. Pat. No. 6,028,627 discloses a camera system for capturing a sporting activity from the perspective of the user, whereby a mount structure is located proximate to a mouth guard of a safety helmet. US 2007/280675 and US 2006008269 disclose a configurable wrist or arm worn camera harness. However, the harnesses of these arrangements use a mechanical clasping system which can only be fixed to suitably modified cameras and such arrangements are not suitable therefore for universal attachment of cameras or mobile phones.

Further arrangements include so-called Bullet Cameras, examples of which are shown in JP 7,131,697 and U.S. Pat. No. 5,583,571, which can be mounted to a users head or head wear using a head strap mount, or to head wear such as helmets using suction mounts. However, there are various problems with such arrangements. Bullet cameras require hand held controllers to be attached to the camera to enable the camera to be operated. Therefore when using such devices the users attention may be distracted when searching for and operating the hand held control. Another disadvantage is the cumbersome nature of these devices which can take time to set up and often require wires from the head camera to a separate storage device mounted elsewhere on the body. Most disadvantageous however, is the cost of such camera packages, which makes them unattractive to all but the most dedicated photographer.

The present invention seeks to provide for a head strap mount for a camera having advantages over known systems.

According to a first aspect of the present invention there is provided a head support for a camera formed of a strap suitable for attachment to a users head and comprising a pocket suitable for receiving a compact type camera, wherein the pocket includes a lens aperture.

Advantageously, the present invention provides a universal support which is capable of supporting different types of compact cameras. For example the compact type camera may include a mobile phone incorporating a camera function, or a disposable, single use type camera.

Advantageously the head support allows the user to simply and efficiently mount a compact camera to their head for use during sporting activity. By mounting a compact camera in this way the user can operate the camera to take still or video images whilst keeping their gaze and attention focused in the direction of travel and on the activity in question.

Preferably, the strap is formed of a continuous loop of elasticated material, thereby allowing the support to be easily attached to a user head or headwear through the elastic force of the material.

Preferably still the strap can include a buckle member to allow for adjustment of the strap diameter.

More preferably, the pocket can be formed of a waterproof material, providing protection for the camera from the elements.

The material of the pocket may also be elasticated. The elasticised nature of the strap and/or of the pocket make the head support almost universal in its application, allowing it to accommodate a large variety of camera shapes and sizes. The pocket may also be flexible further increasing its universal accommodation of cameras of different shapes and sizes.

Also provided in accordance with the present invention is a camera head mount comprising: a strap for encircling the head and means for securing the strap around the head to prevent or hinder slippage of the camera head mount once secured in its mounted position; a camera holding pocket provided on the strap and situated such that when the camera head mount is secured in its mounted position the camera holding pocket is adapted to hold a camera in a forward-facing position against the forehead of the user, the lens of a mounted camera pointing forwards and through a lens aperture provided in the camera holding pocket at the front thereof, the camera holding pocket otherwise being adapted substantially to enclose a camera therein in a mounted and supported position on the forehead of the user.

The camera holding pocket may be provided on its back with cushioning means for increasing the comfort of the wearer when the camera holding pocket is mounted and secured directly against the forehead of the user.

In use the camera holding pocket preferably encloses the camera to an extent sufficient to provide full support to the camera in its mounted position. The enclosure may however be sufficiently open to allow access to the camera controls, and perhaps also to allow aesthetic display of the mounted camera.

The camera holding pocket may be provided at its rear with a wedge portion for adjusting the vertical line of camera sight through the lens aperture in use of the camera head mount. The wedge may be adjustable or interchangeable with a second wedge portion of different incline to effect adjustment of the vertical line of camera sight.

At least a portion of the strap and/or of the camera holding pocket may be provided on its underside with a material having a higher coefficient of friction than the primary material of the camera head mount in order to assist secure mounting on the head or helmet. The underside material may be a rubbery material.

The primary material of the strap and/or of the camera holding pocket may be an elasticated material.

In this case the elasticated nature of the camera holding pocket allows the pocket to accommodate different shapes and/or sizes of camera.

The lens aperture may be oversized in order that the camera holding pocket may accommodate different shapes and/or sizes of camera and yet permit the lens of each camera to register with the lens aperture.

The camera holding pocket may have a front section comprising the lens aperture, and the lens aperture may account for at least 10%, or 25%, or 50% or 75% of the surface area of the front section.

At least one functional element of a mounted camera other than the lens may be accessible through the lens aperture. For example the camera flash may be accessible through the lens aperture and may have an at least partial line of sight therethrough.

According to a second aspect of the present invention, there is provided article of headwear comprising a head support for a camera according to the first aspect of the invention, wherein the article of headwear is a hat or helmet.

BRIEF DESCRIPTION OF DRAWINGS

The invention is described further hereinafter, by way of example only, with reference to the accompanying drawings, in which.

DETAILED DESCRIPTION

Figure 1A:
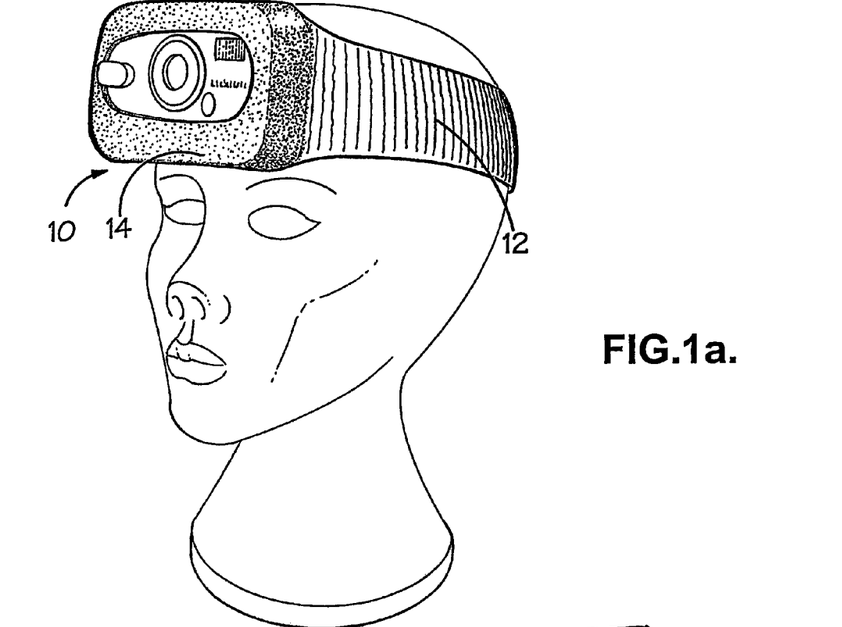
FIG. 1a is a front view of the support fixed around a users head.

In overview and with reference to FIG. 1a, the present invention generally comprises a support 10 suitable for mounting a compact camera, such as a digital compact camera or disposable type camera on a users head. The mount 10 comprises a strap body 12 and a camera pocket 14 into which a camera can be supportably inserted. The strap body 12 is generally formed of a suitable synthetic or natural elasticated webbing material such as nylon or cotton. The strap body 12 can be formed as a continuous loop of material, whereby the support can be held on a users head by the elastic force of the material.

Figure 1B:
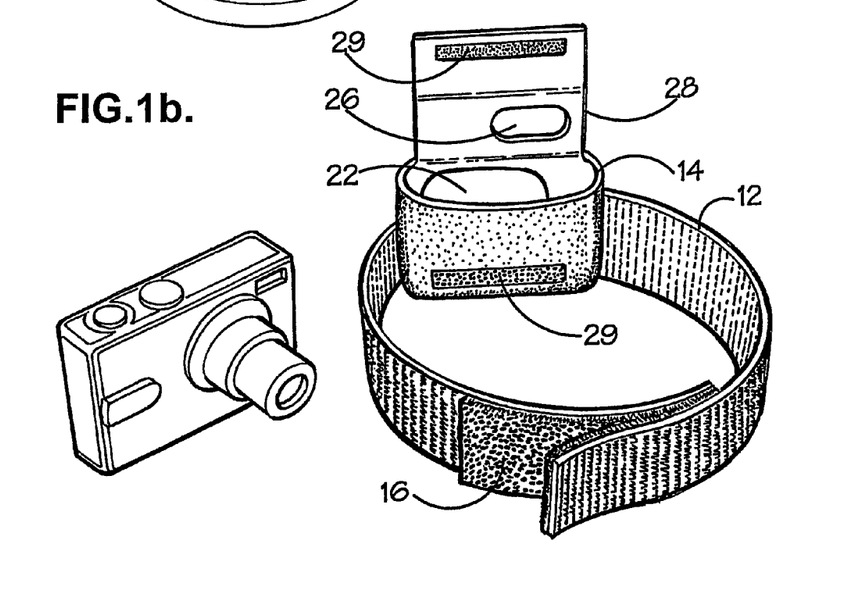
FIG. 1b is a rear view of the support.

Alternatively however, as shown in FIG. 1b the strap body 12 as discussed above, formed of a suitable elasticated webbing material, can comprise a Velcro or buckle arrangement 16 to allow the strap to be adjustably tightened and held around the users head or headgear, thereby allowing the strap to fit various sized heads.

Alternatively still, the strap body 12 can be formed as a single elongated piece of suitable elasticated webbing material having fasteners at each end allowing the support 10 to be adjustably tightened around the users head or headgear. The fasteners can be any suitable type such as Velcro or hook and loop type fasteners.

As mentioned above the camera pocket 14, which is shown in FIGS. 1a and 1b, can be attached to a strap body 12 and is suitable for encasing and supporting a compact camera. As with the strap body 12, the pocket can be formed from a suitable webbing material and can be elasticated to support the camera. Encasing the camera in this manner serves to protect the camera from the elements, and in this regard the webbing material can be any suitable waterproof material.

Figure 2:
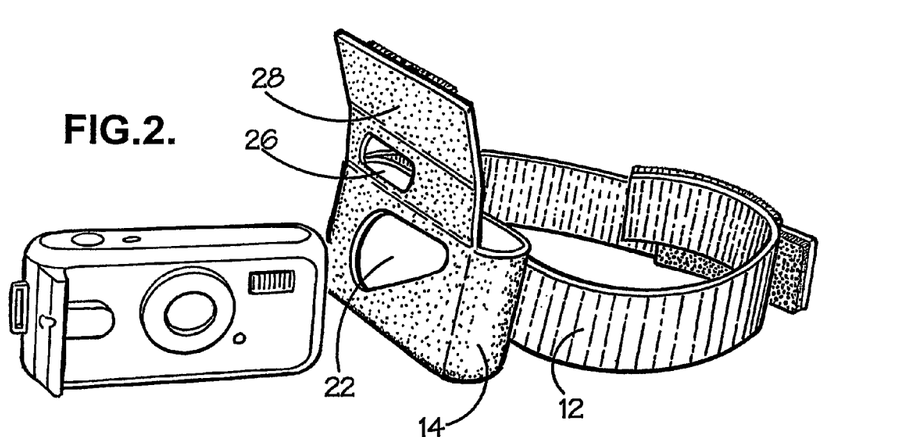
FIG. 2 is a perspective view of the support.

As will be appreciated by one skilled in the art, as shown in FIG. 2, an aperture 22 for the lens and flash of the camera can be formed in the front of the pocket. As an alternative, individual apertures may be provided for each of the lens and flash. Alternatively, the pocket can optionally include cut a away portion 26 allowing direct access to the camera controls, such as the shutter release control, zoom functions, exposure settings and so on. The cut away portion 26 can be covered with a transparent protective material. Alternatively however, these functions can be controlled indirectly through the webbing material without the need for cut away portions.

Figure 3:
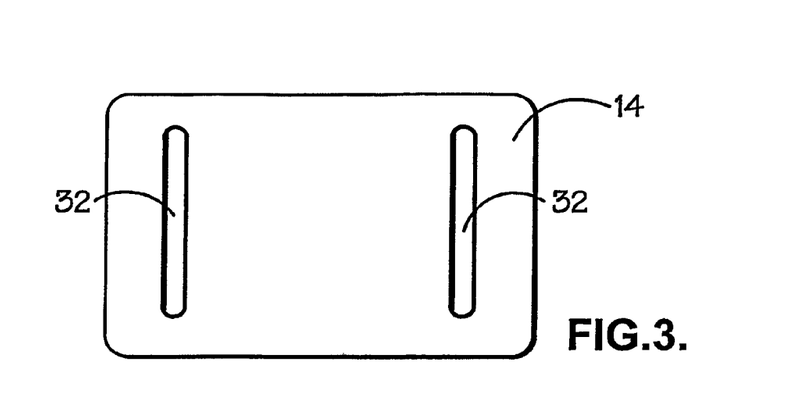
FIG. 3 is a rear view of the camera pocket.
Figure 4A:
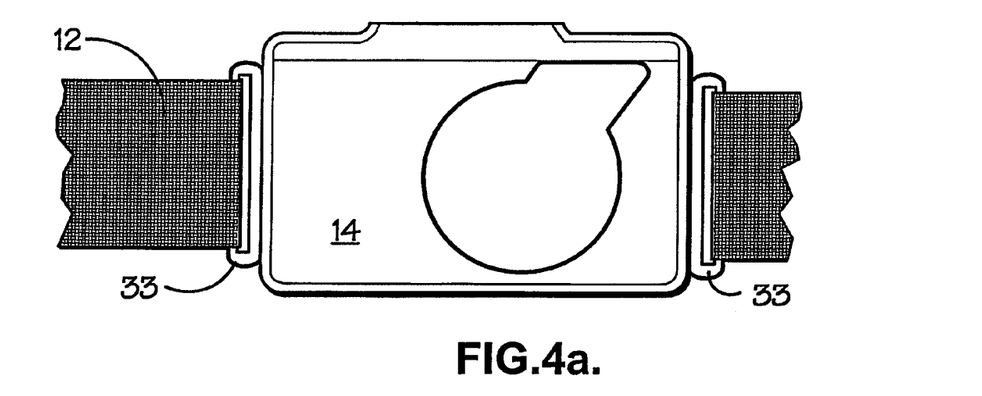
FIGS. 4a and 4b are respective front and rear views of the camera pocket and strap body.
Figure 4B:
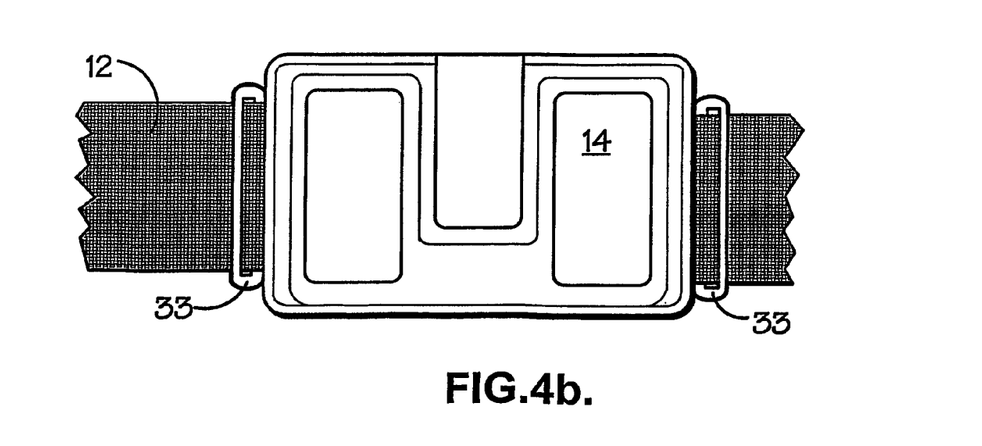

The pocket 14 and the strap body 12 can be formed as an integral piece from the webbing material. Alternatively, the pocket 14 can be formed as a separate piece and can include cut away portions 32 or buckles 33 at the rear to allow insertion of the strap body 12 as shown in FIG. 3 and FIGS. 4a and 4b respectively. The pocket 14 may also include a flap portion 28 arranged to cover the camera when inserted into the pocket 14. The flap portion can include cut away portions as discussed above. The flap portion 28 is arranged to be openably fixed to the pocket portion 14 using Velcro or any suitable fastener 29.

Figure 5:
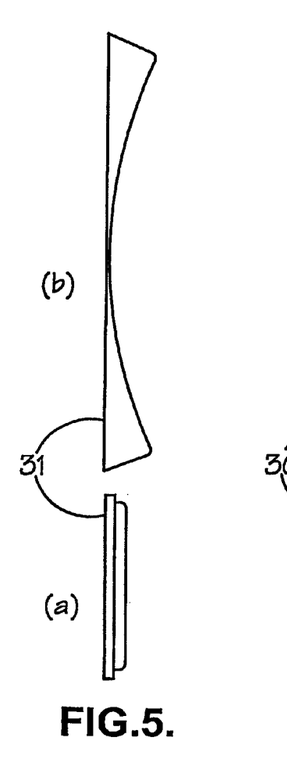
FIGS. 5a and 5b are respective vertical and horizontal cross-sections of the cushioning means.

FIGS. 5a and 5b show a cushioning means 31, which is substantially planar in vertical cross section. In horizontal cross section the cushioning means 31 is shaped so as to conform to a users head or headwear.

Figure 6:
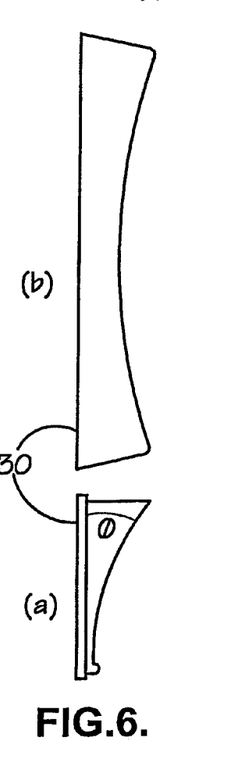
FIGS. 6a and 6b are respective vertical and horizontal cross-sections of the adjustment portions.
Figure 7:
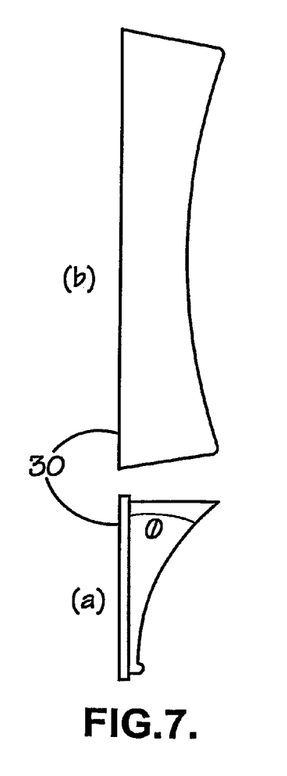
FIGS. 7a and 7b are respective further vertical and horizontal cross-sections of the adjustment portions.
Figure 8A:
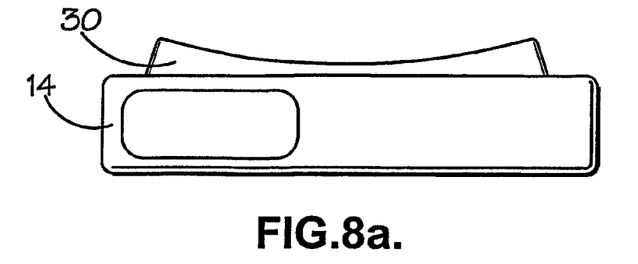
FIGS. 8a and 8b shows an arrangement of adjustment portion attached to the pocket.
Figure 8B:
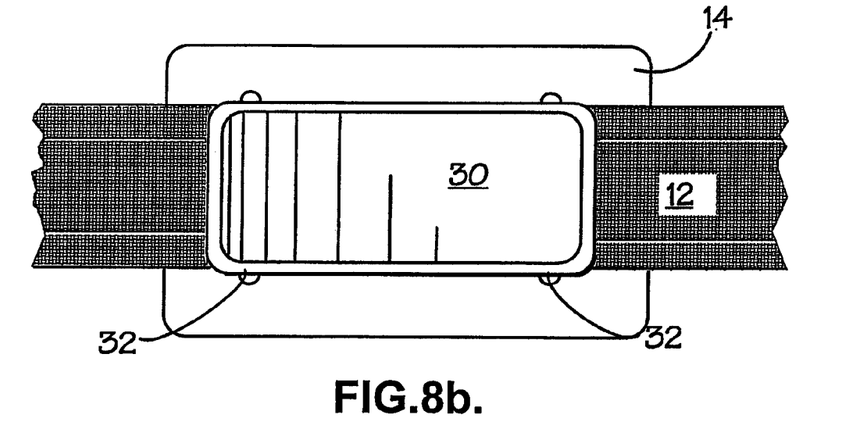
Figure 9:
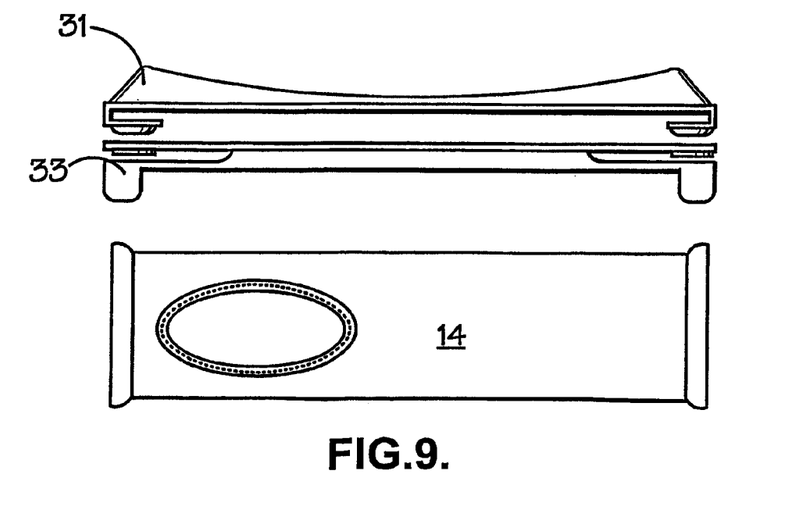
FIG. 9 shows an exploded view of a further arrangement of adjustment portion attached to a pocket.
Figure 10:
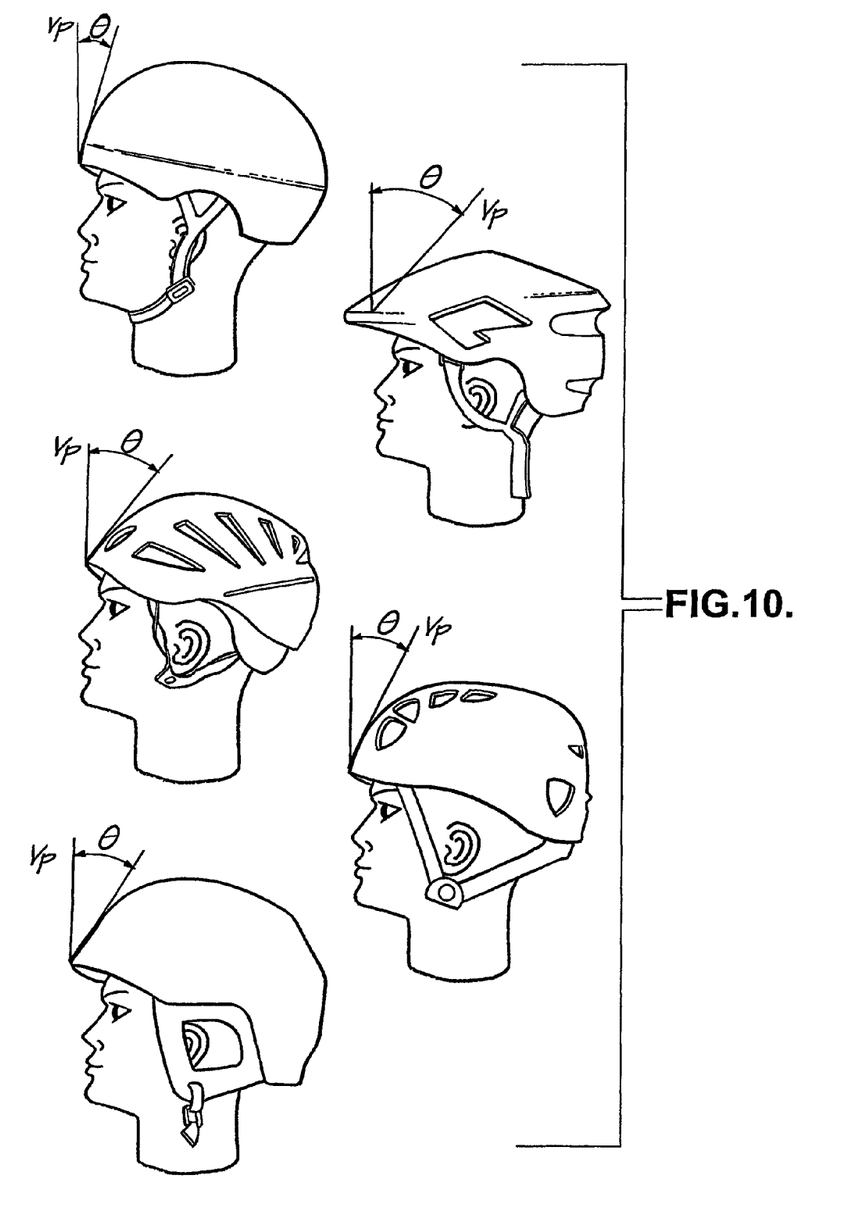
FIG. 10 show vertical lines of sight for various helmet profiles.

Adjustment portions 30 as shown in FIGS. 6a and 6b, and FIGS. 7a and 7b can be provided at the rear of the camera holding pocket as shown in FIGS. 8a and 8b. As shown in FIGS. 6a and 7a the adjustment portions can have an inclined or angled θ, wedge shaped vertical cross section so as to enable the vertical line of the camera sight through the lens aperture to be adjusted, when the camera is mounted to a users head or helmet. As shown in FIG. 10, a substantially vertical line of sight v can be maintained by using adjustment portions of differing angle θ, depending on the shape of the users' headwear. Whilst FIG. 10 only illustrates headwear the skilled addressee would understand the line of sight can similarly be maintained for differing shapes of the users head. The skilled addressee would also understand that for an individual user or headwear the line of sight can be varied by using different angled adjustment portions. The angle of the wedge may be adjustable or interchangeable with additional adjustment portions to vary the line of sight as required. The adjustment portion can also provide the cushioning support as provided by the cushioning means The adjustment portion 30 or cushioning means 31 can be fixed to the rear of the camera holding pocket by any suitable clip, catch or fastening means 33, as shown in FIG. 9. Alternatively, in the case of camera holding pockets formed of webbing material the adjustment portion or cushioning means can be inserted between the rear of the camera and the camera holding pocket.

Figure 11:
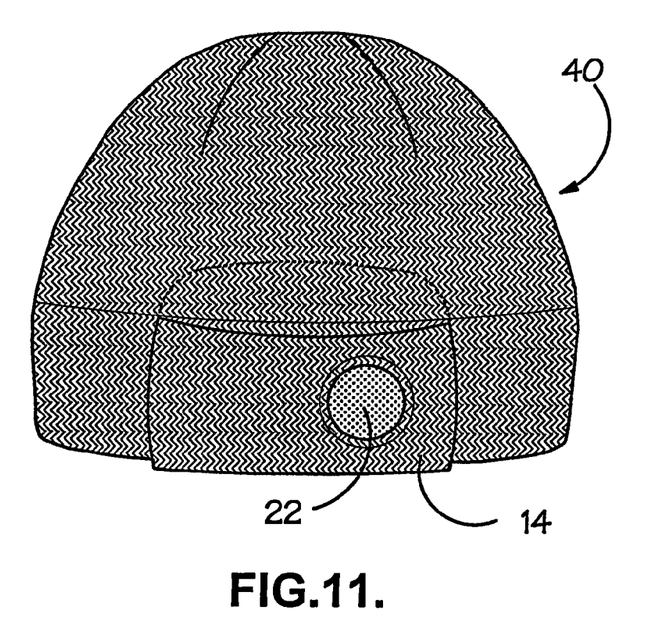
FIG. 11 shows a hat including a camera support according to the present invention.
Figure 12:
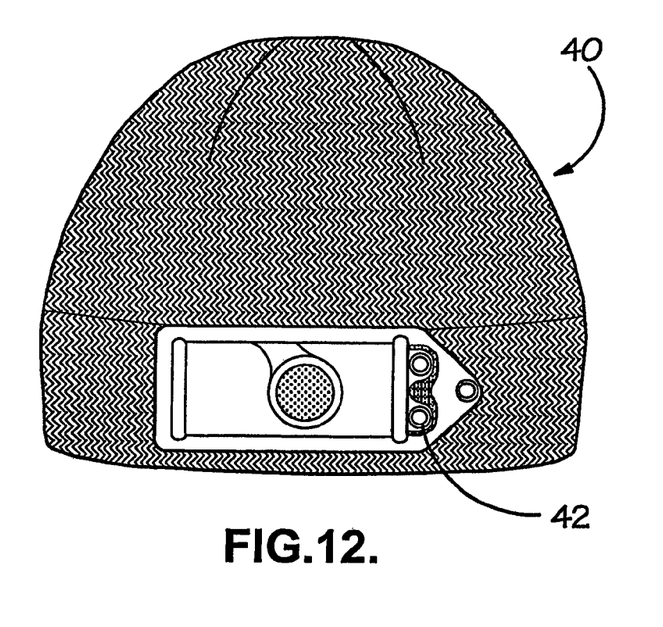
FIG. 12 shows a hat including an attachment portion for receiving a camera pocket.

In a further embodiment of the invention, the support for the camera 10 can be provided as a hat. As shown in FIG. 11, the hat 40 can integrally include a camera holding pocket 14 as discussed above. The hat 40 can be elasticated around its circumference so that the hat can be supported on a users head. Alternatively, the hat can be provided with a buckle arrangement (not illustrated), to allow it to be tightened around a users head. As shown in FIG. 12, the hat can include a attachment portion 42, which allows a camera holding pocket 14, formed as a separate piece to be fixed to the hat. The strap body 12 and pocket 14, as discussed above may be integrally formed with the hat 40.

In this way, it can be seen that the present invention provides for a head strap mount that allows the user to simply and efficiently mount a compact camera to their head for use during sporting activity.

The invention claimed is:

1. A head mount for a camera formed of a strap suitable for encircling a user's head and suitable for encircling an item of headgear and comprising a pocket suitable for receiving into it a compact digital or disposable camera, wherein the pocket includes a lens aperture and is adapted substantially to enclose a camera therein in a mounted and supported position on the forehead of the user.

2. The mount of claim 1, wherein the strap is formed of a continuous loop of elasticated material, and optionally forms part of, or is integral with a headband of an item of headwear.

3. The mount of claim 1, wherein the strap can include a buckle member arranged for adjusting the diameter of the strap.

4. The mount of claim 1, wherein the pocket is formed of elasticated material.

5. The mount of claim 1, wherein the pocket is formed of a flexible material.

6. The mount of claim 1, wherein the pocket comprises: a major surface arranged to cover the front of the camera, except for the lens aperture, wherein the lens aperture is positioned in a central region of the major surface.

7. The mount of claim 1, wherein the pocket includes side walls, a bottom panel, top panel and flash aperture.

8. The mount of claim 7, wherein the top panel includes one or more cut away portions arranged to allow access to the camera controls.

9. The mount of claim 8, wherein the cut away portions are covered with a transparent material.

10. The mount of claim 7, wherein the top panel is arranged as a flap to allow a camera to be inserted and removed from the pocket.

11. The mount of claim 10, wherein the top panel is openably fixed to the pocket with a fastener.

12. The mount of claim 11, wherein the fasteners are Velcro or hook and loop type fasteners.

13. The mount of claim 1, wherein the strap is formed of an elongate member of elasticated material having fasteners at each end.

14. The mount of claim 1, wherein the pocket is formed of a waterproof material.

15. An article of headwear comprising a head support for a camera as claimed in claim 1, wherein the article of headwear is a hat or helmet.

16. A camera head mount comprising: a strap for encircling a head of a user and means for securing the strap around the head to prevent or hinder slippage of the camera head mount once secured in its mounted position; a camera holding pocket provided on the strap and situated such that when the camera head mount is secured in its mounted position the camera holding pocket is adapted to hold a compact digital or disposable camera in a forward-facing position against the forehead of the user, the lens of a mounted camera pointing forwards and through a lens aperture provided in the camera holding pocket at the front thereof, the camera holding pocket otherwise being adapted substantially to enclose the camera therein in a mounted and supported position.

17. A camera head mount according to claim 16, wherein the camera holding pocket is provided on its back with cushioning means for increasing the comfort of the wearer when the camera holding pocket is mounted and secured directly against the forehead of the user.

18. A camera head mount according to claim 16, wherein the camera holding pocket is provided in its bottom with a wedge portion for adjusting the vertical line of camera sight through the lens aperture in use of the camera head mount.

19. A camera head mount according to claim 18, wherein the wedge is adjustable or interchangeable with a second wedge portion of different incline to effect adjustment of the vertical line of camera sight.

20. A camera head mount according to claim 16, wherein at least a portion of the strap and/or of the camera holding pocket is provided on its underside with a material having a higher coefficient of friction than the primary material of the camera head mount in order to assist secure mounting on the head or helmet.

21. A camera head mount according to claim 20, wherein the underside material is a rubbery material.

22. A camera head mount according to claim 16, wherein the primary material of the strap and/or of the camera holding pocket is an elasticated material.

23. A camera head mount according to claim 22, wherein the elasticated nature of the camera holding pocket allows the pocket to accommodate different shapes and/or sizes of camera.

24. A camera head mount according to claim 16, wherein the lens aperture is oversized in order that the camera holding pocket may accommodate different shapes and/or sizes of camera and yet permit the lens of each camera to register with the lens aperture.

25. A camera head mount according to claim 24, wherein the camera holding pocket has a front section comprising the lens aperture, and wherein the lens aperture accounts for at least 10% of the surface area of the front section.

26. A camera head mount according to claim 25, wherein the lens aperture accounts for at least 25% of the surface area of the front section.

27. A camera head mount according to claim 26, wherein the lens aperture accounts for at least 50% of the surface area of the front section.

28. A camera head mount according to claim 27, wherein the lens aperture accounts for at least 75% of the surface area of the front section.

29. A camera head mount according to claim 16, wherein at least one functional element of a mounted camera other than the lens is accessible through the lens aperture.

30. A camera head mount according to claim 29, wherein the camera flash is accessible through the lens aperture and has an at least partial line of sight therethrough.

31. A camera head mount according to claim 16, wherein the camera holding pocket may be provided on its back with cushioning means for increasing the comfort of the wearer.

32. A camera head mount according to claim 16, wherein the camera holding pocket may be provided with a adjustment portion for adjusting the line of sight of the camera.

33. An article of headwear comprising a camera head mount as claimed in claim 16, wherein the article of headwear is a hat or helmet.

* * * * *